United States Patent
Ahne et al.

(10) Patent No.: US 8,014,005 B2
(45) Date of Patent: Sep. 6, 2011

(54) METHOD FOR USING AN IMAGING APPARATUS TO GENERATE IMAGE PANELS FOR ASSEMBLY AS A POSTER

(75) Inventors: Adam J. Ahne, Lexington, KY (US); Ronald T. Sellers, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 1374 days.

(21) Appl. No.: 11/236,063

(22) Filed: Sep. 27, 2005

(65) Prior Publication Data
US 2007/0076257 A1 Apr. 5, 2007

(51) Int. Cl.
*G06K 15/00* (2006.01)
(52) U.S. Cl. .................. 358/1.1; 358/1.18; 358/538
(58) Field of Classification Search ............. 358/1.1, 358/1.18, 538; 400/76
See application file for complete search history.

(56) References Cited

U.S. PATENT DOCUMENTS

| | | | |
|---|---|---|---|
| 5,140,647 A | 8/1992 | Ise et al. | |
| 5,337,161 A | 8/1994 | Hube' | |
| 5,566,005 A | 10/1996 | Yamada | |
| 5,644,411 A | 7/1997 | Tamagaki et al. | |
| 5,666,471 A | 9/1997 | Fujii | |
| 6,004,421 A * | 12/1999 | Landa | 156/258 |
| 6,256,109 B1 | 7/2001 | Rosenbaum et al. | |
| 6,393,163 B1 | 5/2002 | Burt et al. | |
| 6,491,361 B1 * | 12/2002 | Spann | 347/2 |
| 6,549,300 B2 | 4/2003 | Motamed et al. | |
| 6,591,076 B2 | 7/2003 | Connors | |
| 6,650,791 B1 | 11/2003 | Cullen | |
| 6,652,171 B1 * | 11/2003 | Onishi | 400/621 |
| 6,744,931 B2 | 6/2004 | Komiya et al. | |
| 6,833,930 B2 | 12/2004 | Nishikawa et al. | |
| 7,475,912 B1 * | 1/2009 | Reffett | 283/81 |
| 2003/0001019 A1 * | 1/2003 | Corby, Jr. | 235/494 |
| 2003/0051381 A1 * | 3/2003 | Hernandez et al. | 40/586 |
| 2004/0012796 A1 * | 1/2004 | Matsuyama | 358/1.2 |
| 2004/0013455 A1 * | 1/2004 | Matsuyama | 400/76 |
| 2006/0275071 A1 * | 12/2006 | Evans et al. | 400/621 |

FOREIGN PATENT DOCUMENTS
JP 2002187261 A * 7/2002
* cited by examiner

*Primary Examiner* — Chan S Park
*Assistant Examiner* — Allen H Nguyen
(74) *Attorney, Agent, or Firm* — John Victor Pezdek (57) ABSTRACT

A method to generate a plurality of image panels for assembly as a poster includes determining an individual image boundary for each of a plurality of image data portions; associating a corresponding incising boundary with each individual image boundary, wherein at least a portion of each individual image boundary is coincident with the corresponding incising boundary; printing an image portion at a location on a sheet of media in accordance with the individual image boundary of an image data portion that corresponds to the image portion; incising the sheet of media with the incising unit along the corresponding incising boundary to form an individual image panel of the plurality of image panels; and repeating the printing and the incising until all of the plurality of image data portions are processed to form the plurality of image panels.

23 Claims, 9 Drawing Sheets

METHOD FOR USING AN IMAGING APPARATUS TO GENERATE IMAGE PANELS FOR ASSEMBLY AS A POSTER

BACKGROUND OF THE INVENTION

1. Field of the Invention

The present invention relates to an imaging apparatus, and, more particularly, to a method for using an imaging apparatus to generate image panels for assembly as a poster.

2. Description of the Related Art

A typical imaging apparatus, such as a printer or an All-In-One machine (AIO), includes a print engine for forming an image on one or more sheets of print media, such as paper. Such a print engine may be, for example, an ink jet print engine having a reciprocating printhead carrier, or an electrophotographic (e.g., laser) print engine. An AIO is a multifunction unit that is configured to perform stand alone functions, such as copying or facsimile receipt and transmission, or may be connected to a host computer via a communications link to facilitate a printing function.

Many traditional printers and All-In-One machines (AIOs) have the capability to print in a "poster" mode. The poster mode enlarges and prints a single image across multiple pages that the user attaches together to form a poster. The poster size is typically 2×2 (4 pages), 3×3 (9 pages), 4×4 (16 pages), etc. Each page may be, for example, a sheet of paper. This traditional method of creating a poster has several drawbacks.

First, in order for the image to be continuous across the individual pages, the user must use a knife or scissors to manually trim any white border around each page before forming the poster. White borders are inherent to many printers, which typically cannot print all the way to the edge of the sides of the page. In addition, typical edge-to-edge printers cannot be used in the traditional manner for poster creation as they print the images off the edges of the paper, losing data in that area critical for alignment with an adjacent page.

Another drawback is that the user must assemble the individual pages together in the correct order, which can be difficult especially with larger posters, such as those including nine or more pages. Additionally, it may be difficult to hold the pages in the proper position relative to each other as the pages are connected, e.g., taped together, or glued to a backing.

SUMMARY OF THE INVENTION

The invention, in one form thereof, is directed to a method for using an imaging apparatus having a printing unit and an incising unit to generate a plurality of image panels for assembly as a poster for displaying an image. The image is represented by image data, the image data being divided into a plurality of image data portions representing a corresponding plurality of image portions of the image. The method includes determining an individual image boundary for each of the plurality of image data portions; associating a corresponding incising boundary with each individual image boundary, wherein at least a portion of each individual image boundary is coincident with the corresponding incising boundary; printing an image portion of the plurality of image portions at a location on a sheet of media with the printing unit in accordance with the individual image boundary of an image data portion that corresponds to the image portion; incising the sheet of media with the incising unit along the corresponding incising boundary that is associated with the individual image boundary of the image data portion to form an individual image panel of the plurality of image panels; and repeating printing and incising until all of the plurality of image data portions are processed to form the plurality of image panels.

The invention, in another form thereof, is directed to an imaging apparatus configured to generate a plurality of image panels for assembly as a poster for displaying an image, represented by image data, the image data having been divided into a plurality of image data portions representing a corresponding plurality of image portions of the image. The imaging apparatus includes a printing unit for performing printing operations; an incising unit for performing incising operations; and a controller communicatively coupled to the printing unit and the incising unit. The controller executes program instructions to perform the acts of determining an individual image boundary for each of the plurality of image data portions; associating a corresponding incising boundary with each individual image boundary, wherein at least a portion of each individual image boundary is coincident with the corresponding incising boundary; controlling the printing unit to perform the operation of printing an image portion of the plurality of image portions at a location on a sheet of media in accordance with the individual image boundary of an image data portion that corresponds to the image portion; controlling the incising unit to perform the operation of incising the sheet of media along the corresponding incising boundary that is associated with the individual image boundary of the image data portion that corresponds to the image portion to form an individual image panel of the plurality of image panels; and repeating the operations of printing and incising until all of the plurality of image data portions are processed to form the plurality of image panels.

The invention, in another form thereof, is directed to a method for generating a plurality of image panels for assembly as a poster for displaying an image represented by image data, the image data being divided into a plurality of image data portions representing a corresponding plurality of image portions of the image. The method includes (a) providing a sheet of media having an outer boundary, the outer boundary including a plurality of location tabs; (b) associating the outer boundary with an image boundary of one image portion of a plurality of image portions, wherein the image boundary is coincident with the outer boundary only where no location tab exits; and (c) feeding the sheet of media into an imaging apparatus to print the one image portion on the sheet of media.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one or more embodiments of the invention, and such exemplifications are not to be construed as limiting the scope of the invention in any manner.

DETAILED DESCRIPTION OF THE INVENTION

Figure 1:
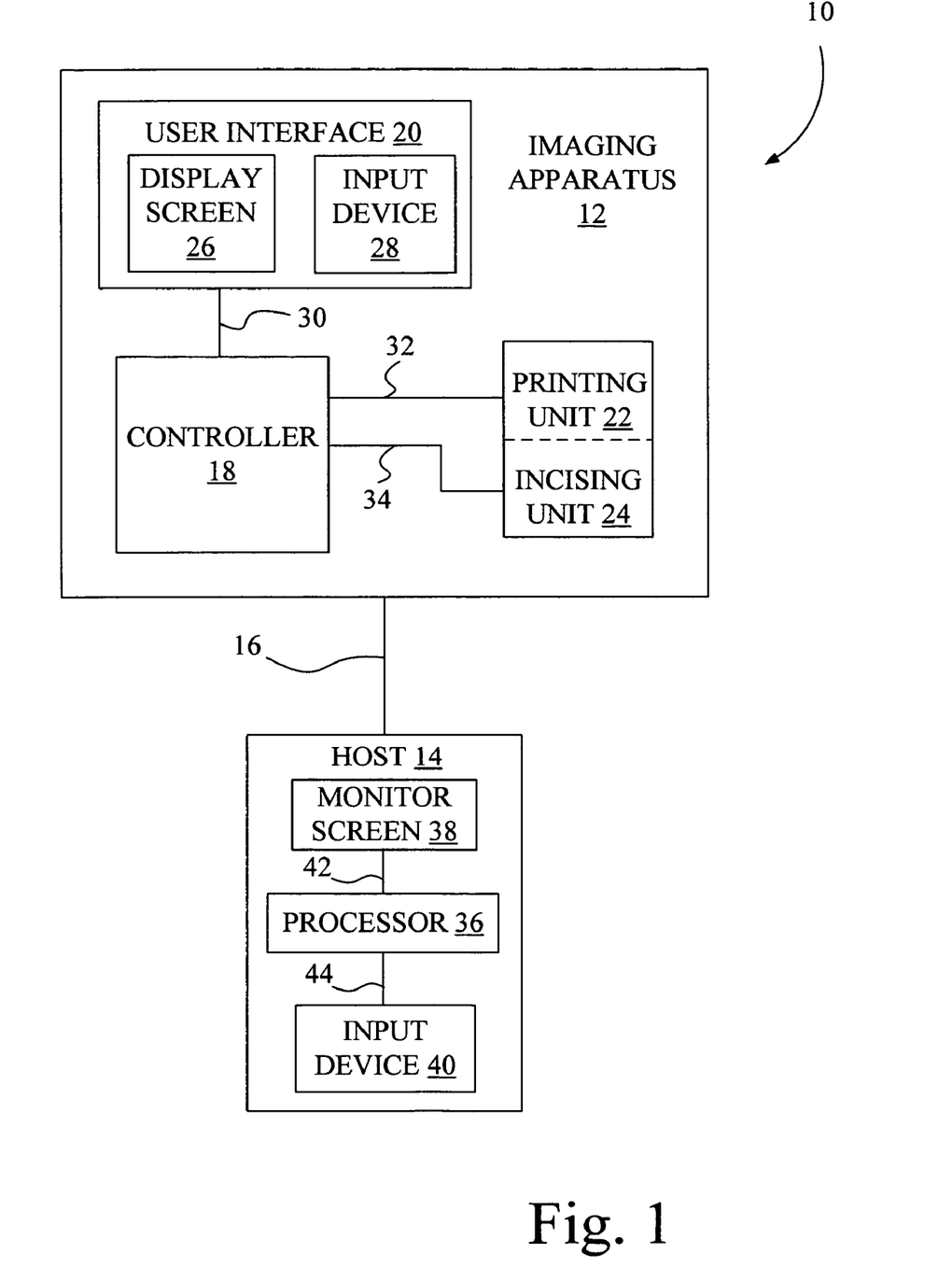
FIG. 1 is a diagrammatic representation of a system implementing the present invention.

Referring now to the drawings and particularly to FIG. 1, there is shown a system 10 embodying the present invention. System 10 includes an imaging apparatus 12, and optionally, a host 14.

Imaging apparatus 12 may be, for example, a printer, such as an ink jet printer, which in turn may form the print engine for an AIO machine, such as for example, a standalone unit that has scanning, copying, and/or faxing functionality, in addition to printing functionality. Host 14, which may be optional, may be communicatively coupled to imaging apparatus 12 via a communications link 16.

As used herein, the term "communications link" generally refers to structure that facilitates electronic communication between two components, and may operate using wired or wireless technology. Accordingly, communications link 16 may be, for example, a direct electrical wired connection, a direct wireless connection (e.g., infrared or r.f.), or a network connection (wired or wireless), such as for example, an Ethernet local area network (LAN) or a wireless networking standard, such as IEEE 802.11.

In the embodiment of FIG. 1, imaging apparatus 12 includes a controller 18, a user interface 20, a printing unit 22 and an incising unit 24. User interface 20 includes a display screen 26 and an input device 28, such as a keypad. Controller 18 is communicatively coupled to user interface 20 via a communications link 30. Controller 18 is communicatively coupled to printing unit 22 via a communications link 32. Controller 18 is communicatively coupled to incising unit 24 via a communications link 34.

Printing unit 22 may be, for example, an ink jet printer having a reciprocating printhead carrier, or other suitable print engine for forming an image on a substrate, such as a sheet of paper.

Incising unit 24 may include, for example, a perforation device and/or a cutting device. One example of a perforation device, which can also be used for cutting, includes a reciprocating needle assembly, and is described in further detail below with respect to FIG. 2. Known cutting devices include, for example, rotary cutters and knife cutters.

In some embodiments of imaging apparatus 12, such as for example where imaging apparatus 12 is an AIO, controller 18 may include in its memory a software or firmware program including program instructions that function as a driver for printing unit 22 and/or incising unit 24, and will be referred to herein as a driver program. The driver program, for example, may include a halftoning unit and a data formatter subroutine that places print data and print commands in a format that can be recognized by printing unit 22, and may include an incising driver subroutine for placing perforation and/or cutting instructions or data in a format that can be recognized by incising unit 24. The driver program may be accessed, for example, by a software application, such as for example, a poster making application, etc., that is executing on imaging apparatus 12.

Figure 2:
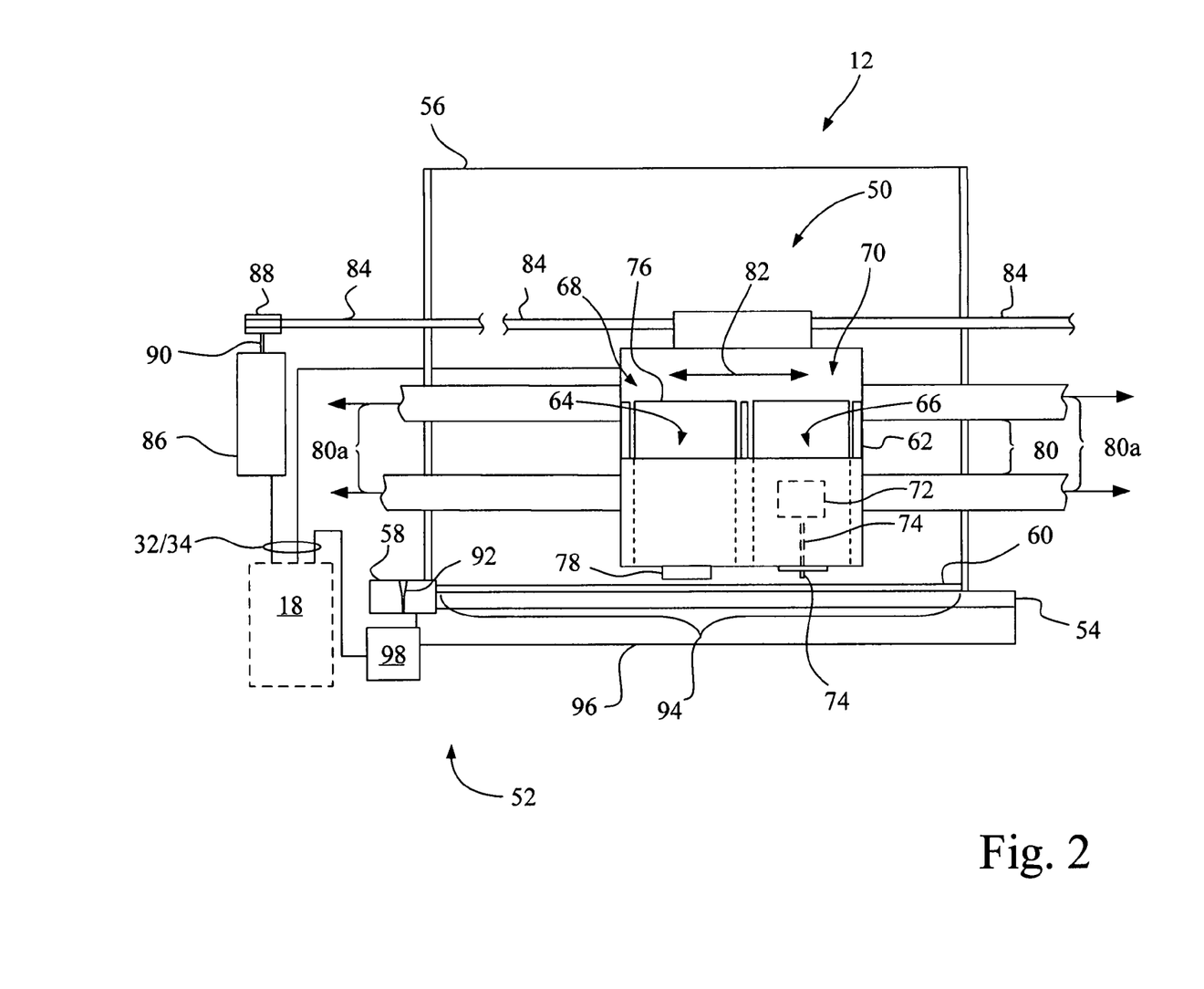
FIG. 2 is a diagrammatic representation of an imaging apparatus configured for use in implementing the present invention.

With the present invention, it is advantageous in some embodiments for incising unit 24 to be combined with printing unit 22 in a single imaging apparatus, as shown in FIGS. 1 and 2. However, those skilled in the art will recognize that the principles of the present invention may be achieved in systems where incising unit 24 is independent from printing unit 22.

In embodiments including host 14, host 14 may be, for example, a personal computer including a processor 36, a monitor screen 38 and an input device (e.g., keyboard) 40, and further includes such devices as input/output (I/O) interfaces, memory, such as RAM, ROM, NVRAM, and a mass data storage device, such as a hard drive, CD-ROM and/or DVD units. Processor 36 is communicatively coupled to monitor screen 38 via communications link 42. Processor 36 is communicatively coupled to input device 40 via communications link 44. Further, processor 36 is communicatively coupled to controller 18 of imaging apparatus 12 via communication link 16.

During a printing/incising operation, host 14 may include in its memory the driver program including program instructions that function as a driver for imaging apparatus 12. The driver program, for example, may include a halftoning unit and a data formatter subroutine that places print data and print commands in a format that can be recognized by printing unit 22, and may include an incising driver subroutine for placing perforation and/or cutting instructions or data in a format that can be recognized by incising unit 24. The driver program may be accessed, for example, by a software application, such as for example, a word processing application, poster making application, etc., that is executing on host 14.

FIG. 2 is one exemplary embodiment of imaging apparatus 12, including printing unit 22 and incising unit 24, which may be used in conjunction with the present invention.

Printing unit 22 and incising unit 24 collectively include, for example, a carrier system 50, a feed roller unit 52, a mid-frame 54, a media source 56, and an incising maintenance station 58.

Media source 56 is configured and arranged to supply from a stack of media a sheet of media 60 to feed roller unit 52, which in turn further transports the sheet of media 60 during a printing operation and/or a perforation operation.

Carrier system 50 includes a carrier 62, i.e., carriage, that is configured with one or more bays, for example bay 64 and bay 66. Each of bays 64, 66 is mechanically and electrically configured to mount, carry and facilitate one or more types of printhead cartridges 68, such as a monochrome printhead cartridge and/or a color printhead cartridge, and/or a perforator cartridge 70 that includes a perforation mechanism 72 driving a perforation device 74, such as a needle or blade, in a reciprocating manner.

Each printhead cartridge 68 includes an ink reservoir 76 provided in fluid communication with a printhead 78, which may include multiple ink jet nozzle arrays. Multiple printheads may be included on printhead cartridge 68. Perforator cartridge 70 is sized and configured to be mechanically and electrically compatible with the configuration of the printhead cartridges 68 so as to be interchangeable therewith in carrier 62 in one of bays 64 and 66.

Carrier 62 is guided by a pair of guide members 80. Either, or both, of guide members 80 may be, for example, a guide rod, or a guide tab formed integral with the imaging apparatus frame. The axes 80a of guide members 80 define a bidirectional scanning path 82 of carrier 62. Carrier 62 is connected to a carrier transport belt 84 that is driven by a carrier motor 86 via a carrier pulley 88. In this manner, carrier motor 86 is drivably coupled to carrier 62 via carrier transport belt 84, although one skilled in the art will recognize that other drive coupling arrangements could be substituted for the example given, such as for example, a worm gear drive. Carrier motor 86 can be, for example, a direct current motor or a stepper motor. Carrier motor 86 has a rotating motor shaft 90 that is attached to carrier pulley 88. Carrier motor 86 is coupled, e.g., electrically connected, to controller 18 via communications link 32.

Incising maintenance station 58 includes an abrasive member 92, such as a ceramic material, arranged to receive and sharpen a perforation device 74, such as for example, a needle or a blade.

At a directive of controller 18, carrier 62 is transported in a controlled manner along bidirectional scanning path 82, via the rotation of carrier pulley 88 imparted by carrier motor 86. During printing, controller 18 controls the movement of carrier 62 so as to cause carrier 62 to move in a controlled reciprocating manner, back and forth along guide members 80. In order to conduct perforator maintenance operations, e.g., sharpening, controller 18 controls the movement of carrier 62 to position carrier 62 in relation to incising maintenance station 58. Printhead 78 is electrically connected to controller 18 via communications link 32. Perforation mechanism 72 is electrically connected to controller 18 via communications link 34.

During a printing/incising operation, the reciprocation of carrier 62 transports printhead 78 and perforation mechanism 72 across the sheet of media 60 along bi-directional scanning path 82, i.e., a scanning direction, to define a print/incising zone 94 of imaging apparatus 12. Bi-directional scanning path 82 is parallel with axes 80a of guide members 80, and is also commonly known as the horizontal direction. Controller 18 supplies electrical address and control signals to the ink jetting actuators of printhead 78 to effect the selective ejection of ink from printhead 78. Further controller 18 supplies control signals to perforation mechanism 72 to effect the selective actuation of perforation mechanism 72 for performing perforating or cutting operations using perforation device 74. During each scan of carrier 62, the sheet of media 60 is held stationary by feed roller unit 52. Feed roller unit 52 includes a feed roller 96 and a drive unit 98. The sheet of media 60 is transported through print/incising zone 94 by the rotation of feed roller 96 of feed roller unit 52. A rotation of feed roller 96 is effected by drive unit 98. Drive unit 98 is electrically connected to controller 18 via communications link 32.

Figure 3:
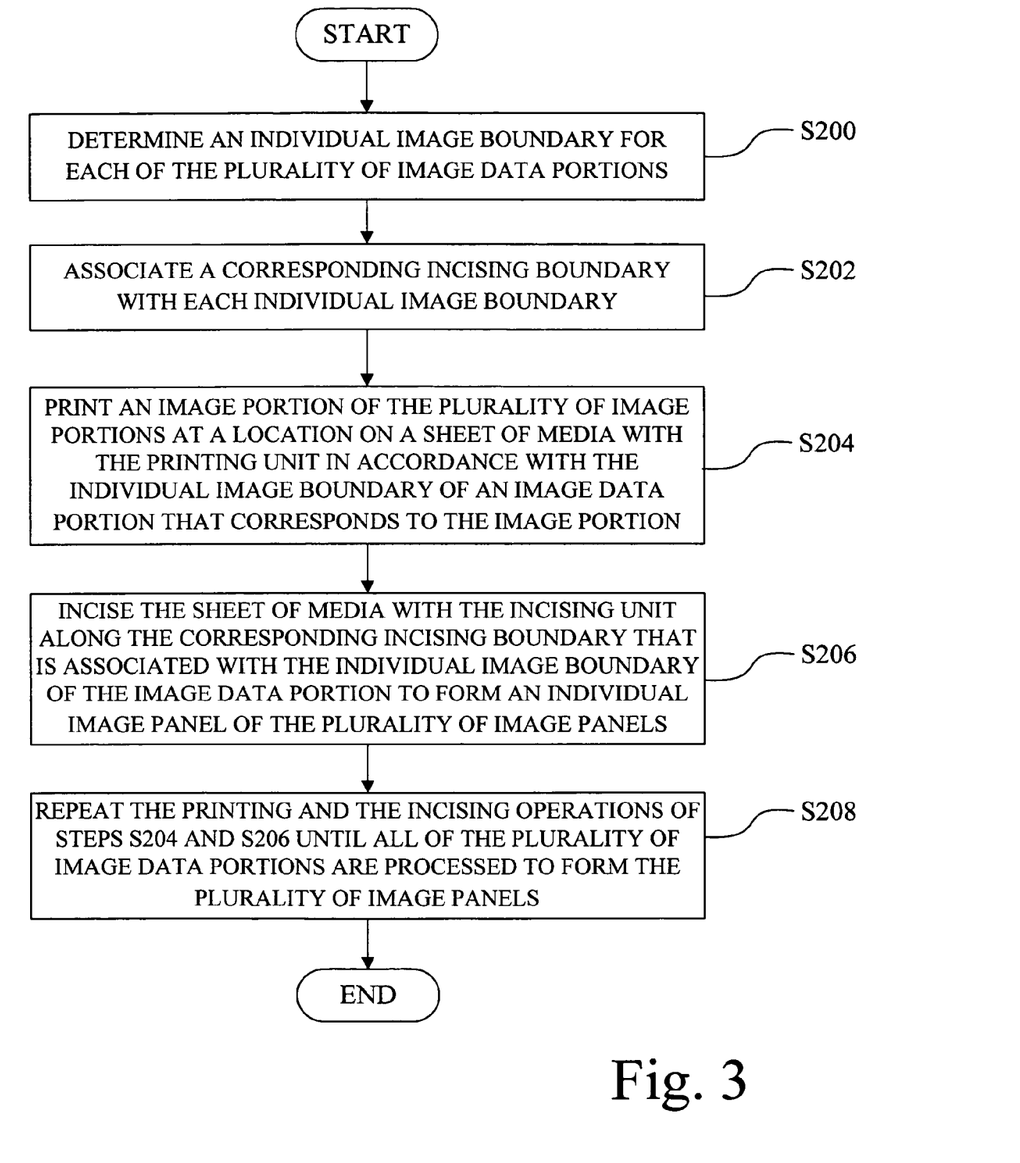
FIG. 3 is a flowchart of an exemplary method to generate a plurality of image panels for assembly as a poster for displaying an image.
Figure 4:
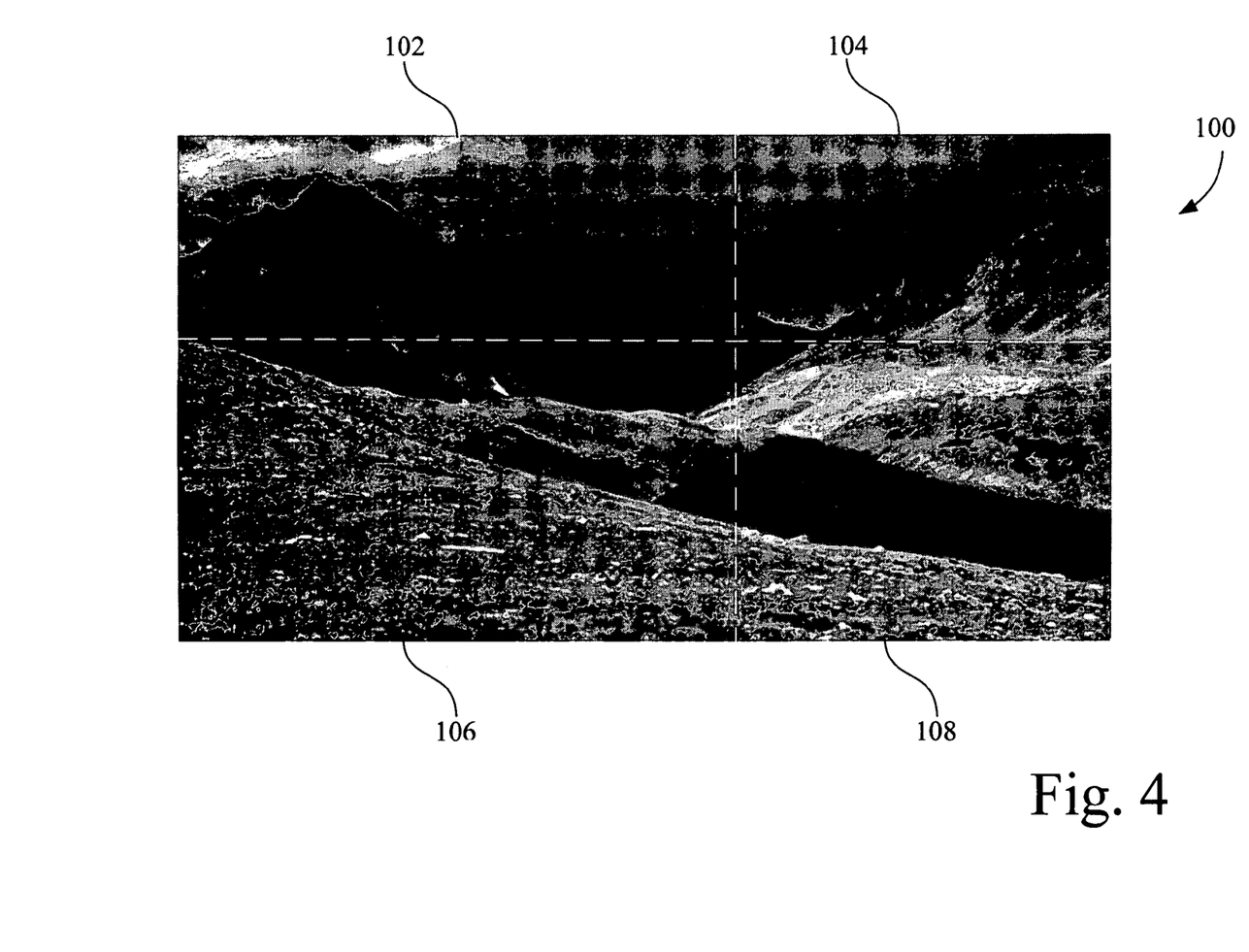
FIG. 4 shows an image having four image portions arranged in a 2 page×2 page poster.

FIG. 3 is a flowchart of an exemplary method, in accordance with the present invention, for using an imaging apparatus, such as imaging apparatus 12 having printing unit 22 and incising unit 24, to generate a plurality of image panels for assembly as a poster for displaying an image. The image is represented electronically by image data. The image data may be generated, for example, by a computer software application, camera, etc. Using know poster generation techniques, the image data is divided into a plurality of image data portions representing a corresponding plurality of image portions of the image. For example, FIG. 4 shows an image 100 that is represented by image data. In order to generate a 2 page×2 page poster, for example, image 100 is divided into four image portions 102, 104, 106 and 108, with each image portion being represented by a corresponding image data portion of the image data. In this example, it is demonstrated that image portions 102, 104, 106 and 108 need not be of equal area, although they may be of equal size, if desired, as shown for example in FIG. 5.

The method of FIG. 3 may be performed, for example, by imaging apparatus 12 via controller 18 executing program instructions to perform various acts, and to control the operation of printing unit 22 and incising unit 24.

Figure 5:
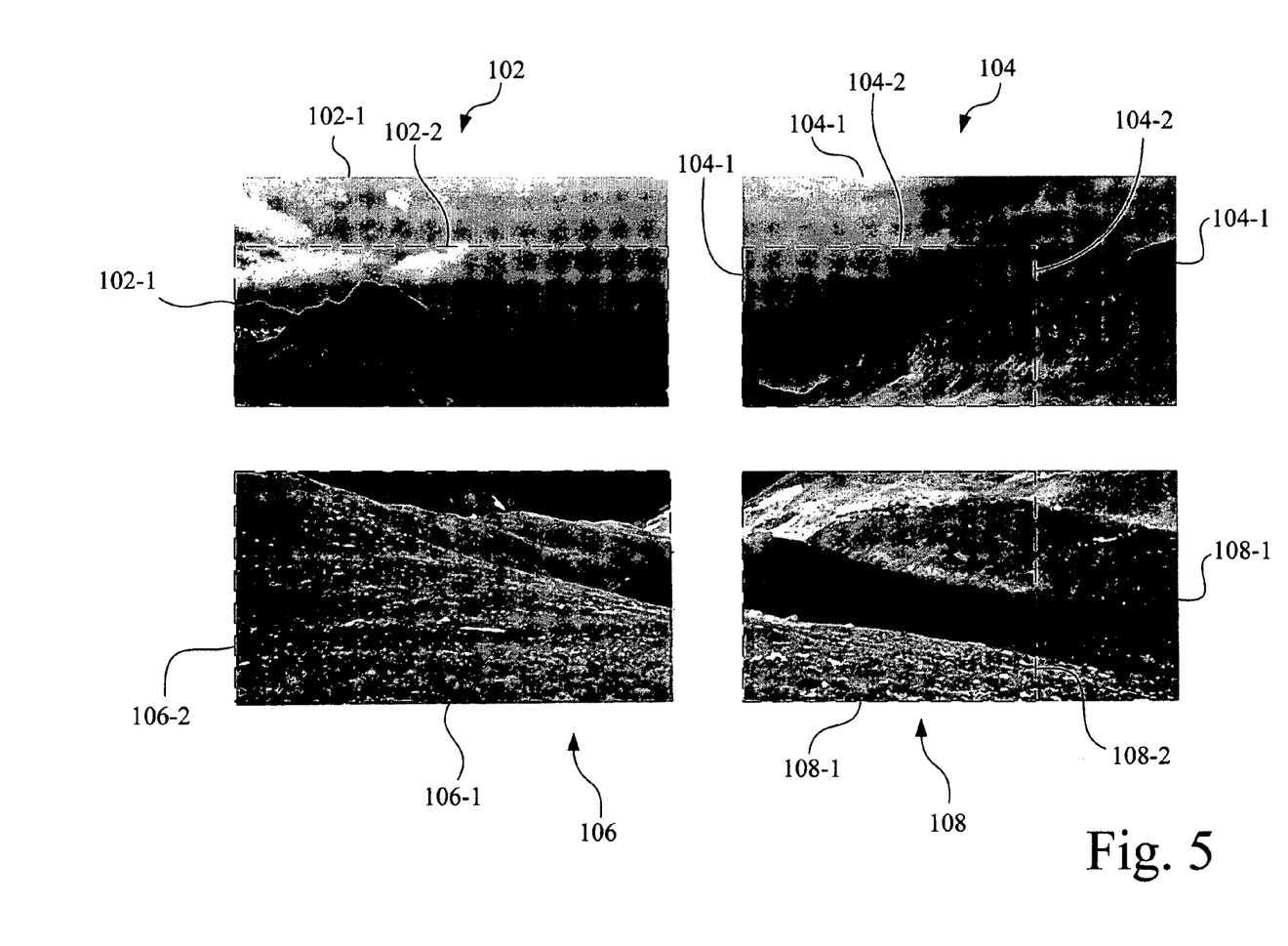
FIG. 5 shows one exemplary implementation of image portions corresponding to the image panels of FIG. 4, identifying individual image boundaries and corresponding incising boundaries.

At step S200, and referring also to FIG. 5, an individual image boundary, e.g., image boundaries 102-1, 104-1, 106-1 and 108-1, is determined for each of the plurality of image data portions representing the corresponding image portions 102, 104, 106 and 108.

At step S202, also referring to FIG. 5, a corresponding incising boundary, e.g., incising boundaries 102-2, 104-2, 106-2 and 108-2, is associated with each of the individual image boundaries 102-1, 104-1, 106-1 and 108-1. The incising boundary is represented by a dashed line. Each of incising boundaries 102-2, 104-2, 106-2 and 108-2 is represented by a plurality of incising coordinates that are supplied to incising unit 24 for incising during an incising operation. The incising boundary may be defined, for example, to remove the standard white border around each page that will be used in assembling the poster, or to crop an image portion, as in the case of image portions 102, 104 and 108, as shown in FIG. 5.

At least a portion of each individual image boundary 102-1, 104-1, 106-1 and 108-1 is coincident with the corresponding incising boundary 102-2, 104-2, 106-2 and 108-2. As shown in the example of FIG. 5, the entirety of image boundary 106-1 is coincident with incising boundary 106-2. However, only a portion of image boundary 102-1 is coincident with incising boundary 102-2, only a portion of image boundary 104-1 is coincident with incising boundary 104-2, and only a portion of image boundary 108-1 is coincident with incising boundary 108-2.

Figure 6:
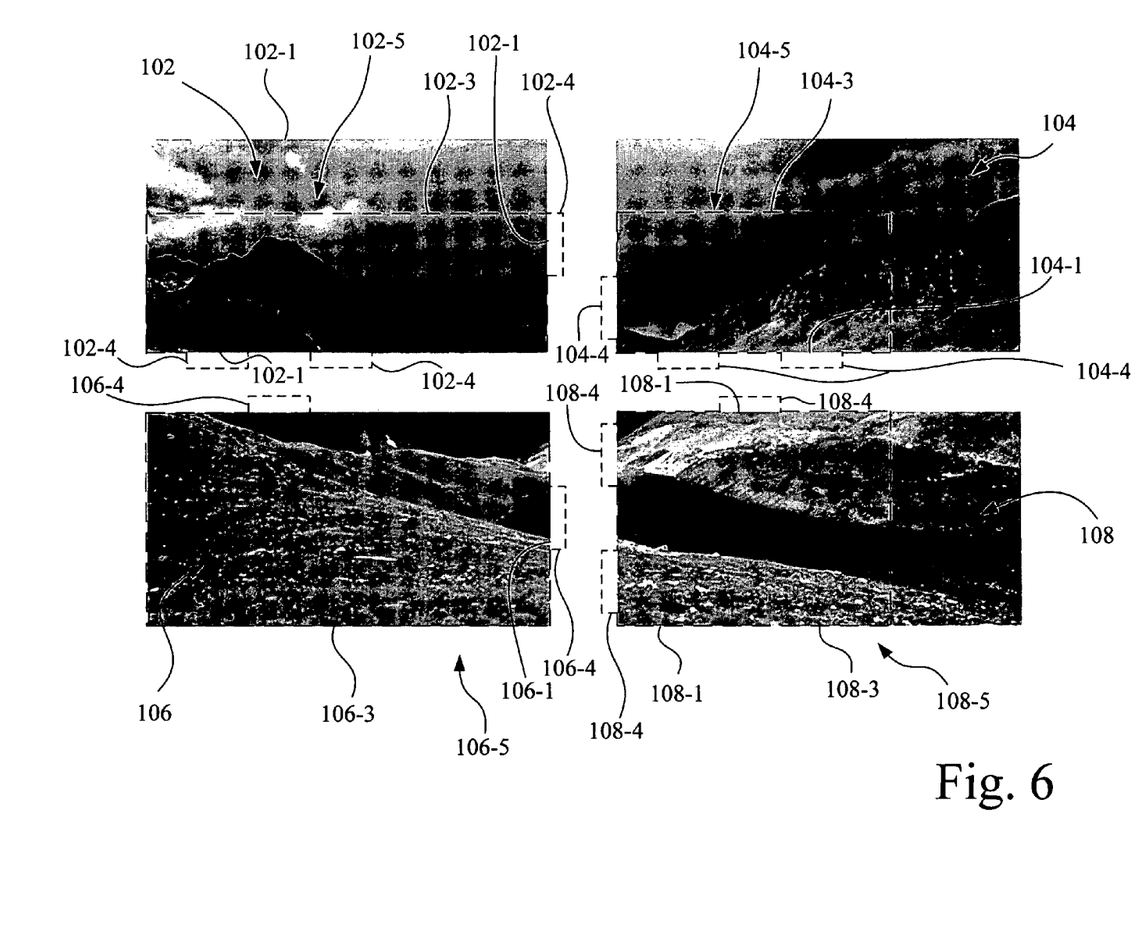
FIG. 6 shows another exemplary implementation of image portions corresponding to the image panels of FIG. 4, identifying individual image boundaries and corresponding incising boundaries that include location tabs.

As a further example, as shown in the implementation of FIG. 6, each incising boundary 102-3, 104-3, 106-3 and 108-3 (represented by dashed lines) include a plurality of location tabs, e.g., 102-4, 104-4, 106-4, and 108-4, that extend outwardly from a corresponding image boundary 102-1, 104-1, 106-1, and 108-1 to aid assembly of the thus defined plurality of image panels 102-5, 104-5, 106-5, 108-5. The plurality of location tabs 102-4, 104-4, 106-4, and 108-4 are arranged around the image boundary 102-1, 104-1, 106-1, and 108-1 of image portions 102, 104, 106 and 108, respectively, and are located to interlock. For example, the lower pair of location tabs of the plurality of location tabs 104-4 of image panel 104-5 is located to receive therebetween, i.e., interlock with, the upwardly facing location tab of the plurality of location tabs 108-4 of image panel 108-5.

In one implementation, for example, location tabs 102-4, 104-4, 106-4, and 108-4 may be arranged such that each sheet would have the same tab layout and yet always interlock with the sheet adjacent to it. This arrangement has the added benefit of automatically aligning the individual pages of the poster in both horizontal and vertical directions. Also, location tabs 102-4, 104-4, 106-4, and 108-4 tabs interlock beneath the pages of the completed poster. This gives some rigidity to the poster during assembly and gives a convenient location for the user to apply tape to attach the pages to one another.

To aid in the bending, deflection, or removal of location tabs 102-4, 104-4, 1064, and 108-4, spaced perforations may be formed along the respective image boundary 102-1, 104-1, 106-1, and 108-1 across the width of the respective location tab.

At step S204, an image portion, such as image portion 102 of the plurality of image portions 102, 104, 106 and 108, is printed at a location on a sheet of media, such as the sheet of media 60, with the printing unit 22 in accordance with the individual image boundary, e.g., individual image boundary 102-1, of an image data portion that corresponds to the image portion, i.e., image portion 102 in this example.

In implementations where location tabs 102-4, 104-4, 106-4, and 108-4 are to be formed, the operation of printing may include printing identifiers, i.e., labels, on the location tabs and the associated reception area on the adjacent sheet to assist the user in correctly assembling the completed poster. The identifiers will be hidden beneath the poster once it is complete. The labels assist the user in assembling the printed image panels 102-5, 104-5, 106-5 and 108-5 of a poster by providing a correspondence between a particular location tab and its corresponding reception area, such as by using an identical label for each. This is most valuable when assembling large posters, such as posters having nine or more image panels.

At step S206, the sheet of media 60 is incised with the incising unit 24 along the corresponding incising boundary, e.g., incising boundary 102-3, that is associated with the individual image boundary, e.g., individual image boundary 102-1, of the image data portion to form an individual image panel, e.g., individual image panel 102-5, of the plurality of image panels 102-5, 104-5, 106-5 and 108-5. In one implementation, incising unit 24 may perform the incising by forming spaced perforations in the sheet of media, e.g., the sheet of media 60, such as by using a perforation needle at a pre-defined perforation density. In another implementation, incising unit 24 may perform the incising by forming a continuous cut, such as by using non-spaced perforations or a rotary or blade cutter. Further, it is contemplated that the incising may be performed using a combination of spaced perforations and continuous cuts.

Figure 7:
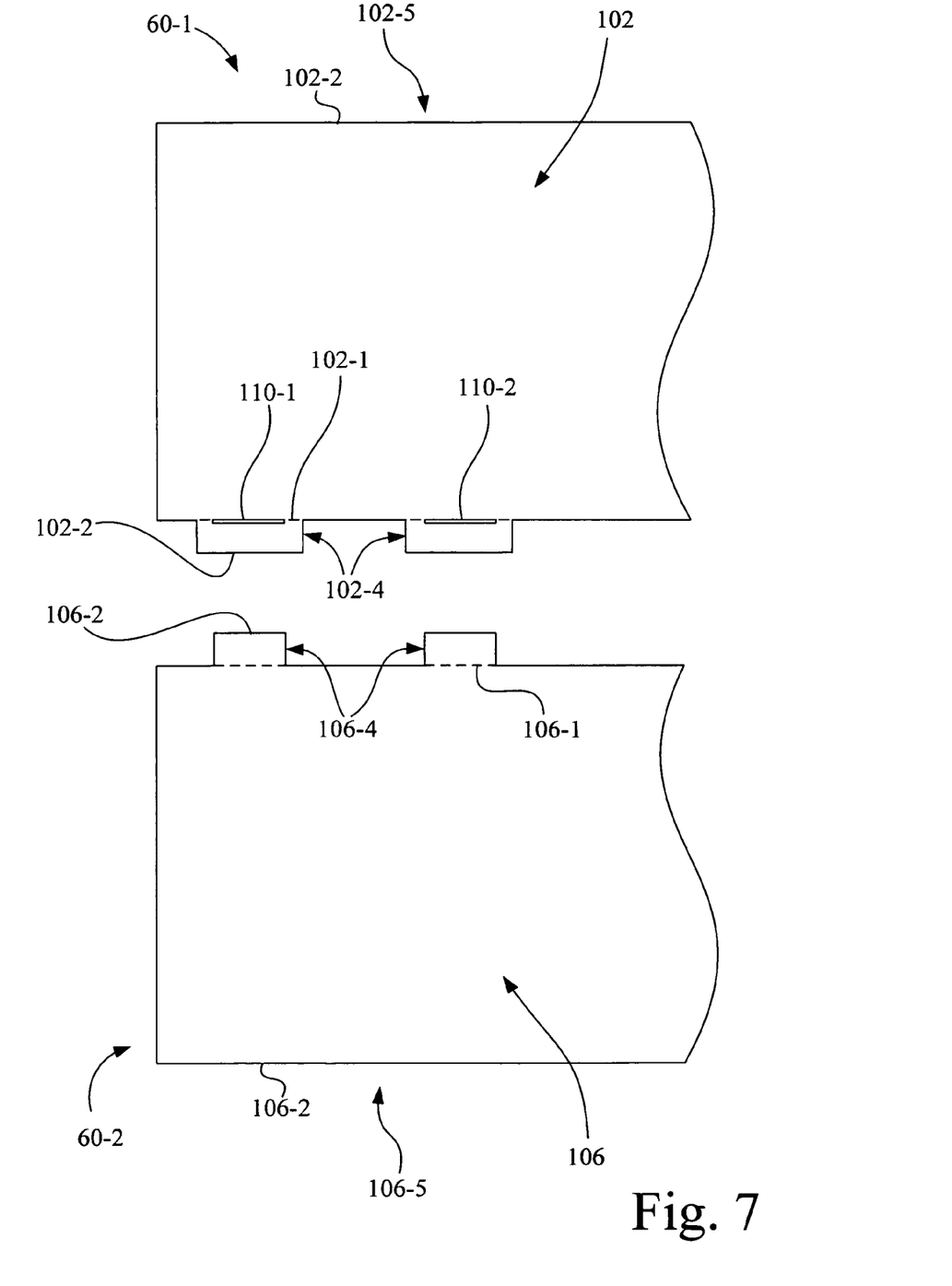
FIG. 7 shows an exemplary implementation wherein the image panel formed from a sheet of media includes a plurality of slots to receive corresponding location tabs of another image panel.

In addition to incising along the individual incising boundary, in one implementation of the present invention shown FIG. 7, during incising, one or more slots 110, e.g., slot 110-1 and slot 110-2 as shown, are formed through a first sheet of media 60-1, e.g., the sheet including image portion 102, along image boundary 102-1. Slots 110-1, 110-2 may be formed, for example, in the respective location tabs 102-4 of sheet of media 60-1 forming individual image panel 102-5. Further, two location tabs 1064 formed in a second sheet of media 60-2 (e.g., the sheet including image portion 106), that extend outwardly from image boundary 106-1 are sized to be received in a corresponding slot, e.g., slot 110-1 and slot 110-2. Likewise slots 110-1 and 110-2 are sized to respectively receive the two location tabs 106-4 of sheet of media 60-2 forming individual image panel 106-5.

Each individual image panel 102-5, 104-5, 106-5 and 108-5 may include a combination of slots, like slot 110-1 and slot 110-2, and location tabs sized to be received in the slots of another image panel.

Figure 8:
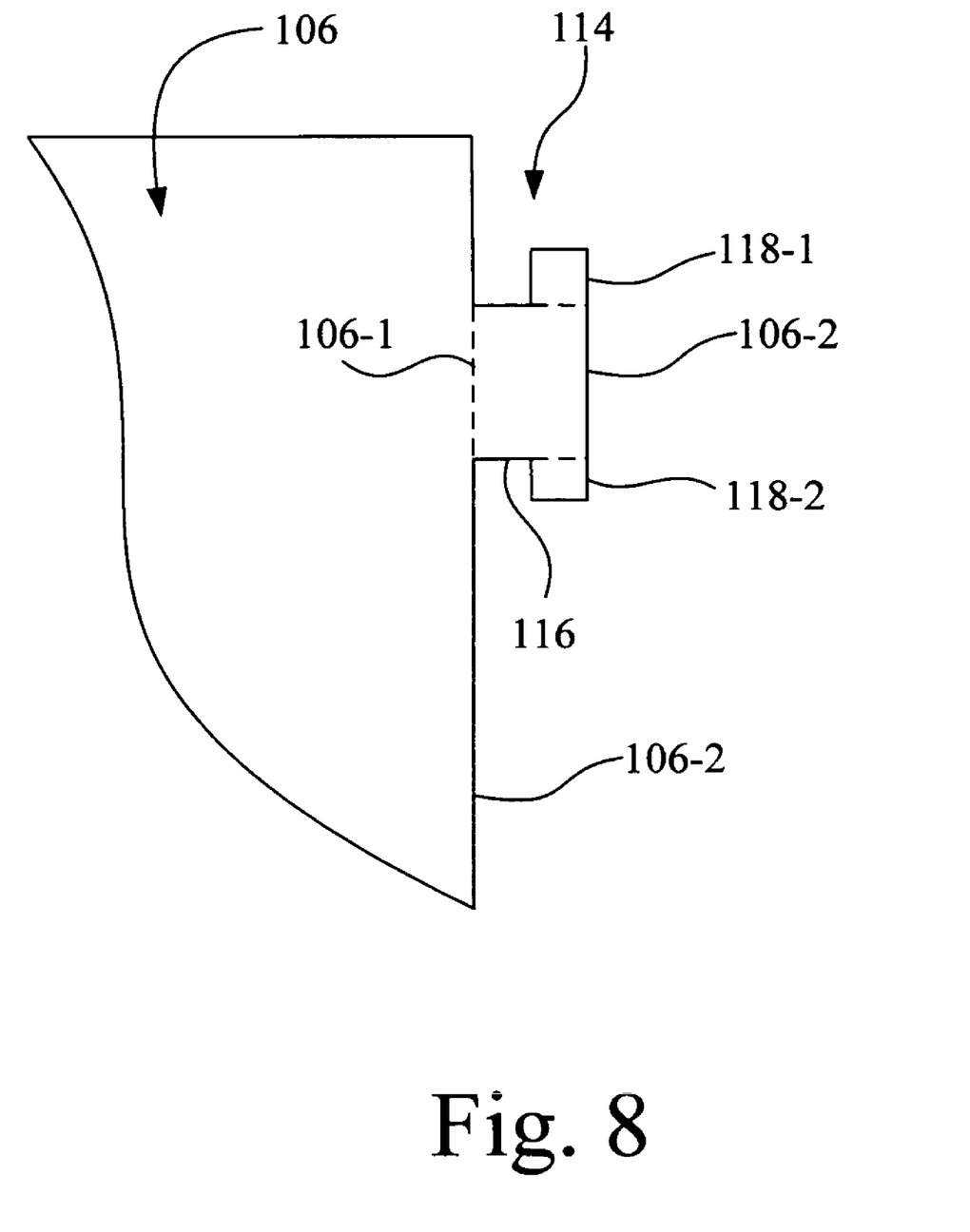
FIG. 8 shows an exemplary implementation wherein a location tab includes a pair of tab extensions forming retaining wings.

In a variation of the implementation shown in FIG. 7, in FIG. 8 there is shown the forming of a location tab 114 having an elongate portion 116 extending from image boundary 106-1, and a pair tab extensions, i.e., wings, 118-1, 118-2, extending laterally outwardly from elongate portion 116. Spaced perforations may be formed along image boundary 106-1, and at the location where the tab extensions 118-1, 118-2 join elongate portion 116, so as to aid in their respective bending, deflection, or removal. For example, tab extensions 118-1, 118-2 may be bent over elongate portion 116 during the insertion of location tab 114 into a slot, such as slot 110-1 shown in FIG. 7, and then following insertion tab extensions 118-1, 118-2 may be unfolded outwardly from elongate portion 116 to lock the respective image panels together without having to use tape or glue.

At step S208, the printing and the incising operations of steps S204 and S206 are repeated until all of the plurality of image data portions, representing image portions 102, 104, 106 and 108, are processed to form the plurality of image panels 102-5, 104-5, 106-5 and 108-5. The plurality of image panels 102-5, 104-5, 106-5 and 108-5 may be formed from a plurality of sheets of media, e.g., a plurality of sheets of paper, with each of the plurality of image panels 102-5, 104-5, 106-5 and 108-5 being formed from a separate sheet of media, such as the sheet of media 60.

Thereafter, the plurality of image panels 102-5, 104-5, 106-5 and 108-5 may be assembled to form the completed poster, and take on the general appearance of image 100 shown in FIG. 4, wherein the white dashed lines represent the seams, which are virtually invisible.

Figure 9:
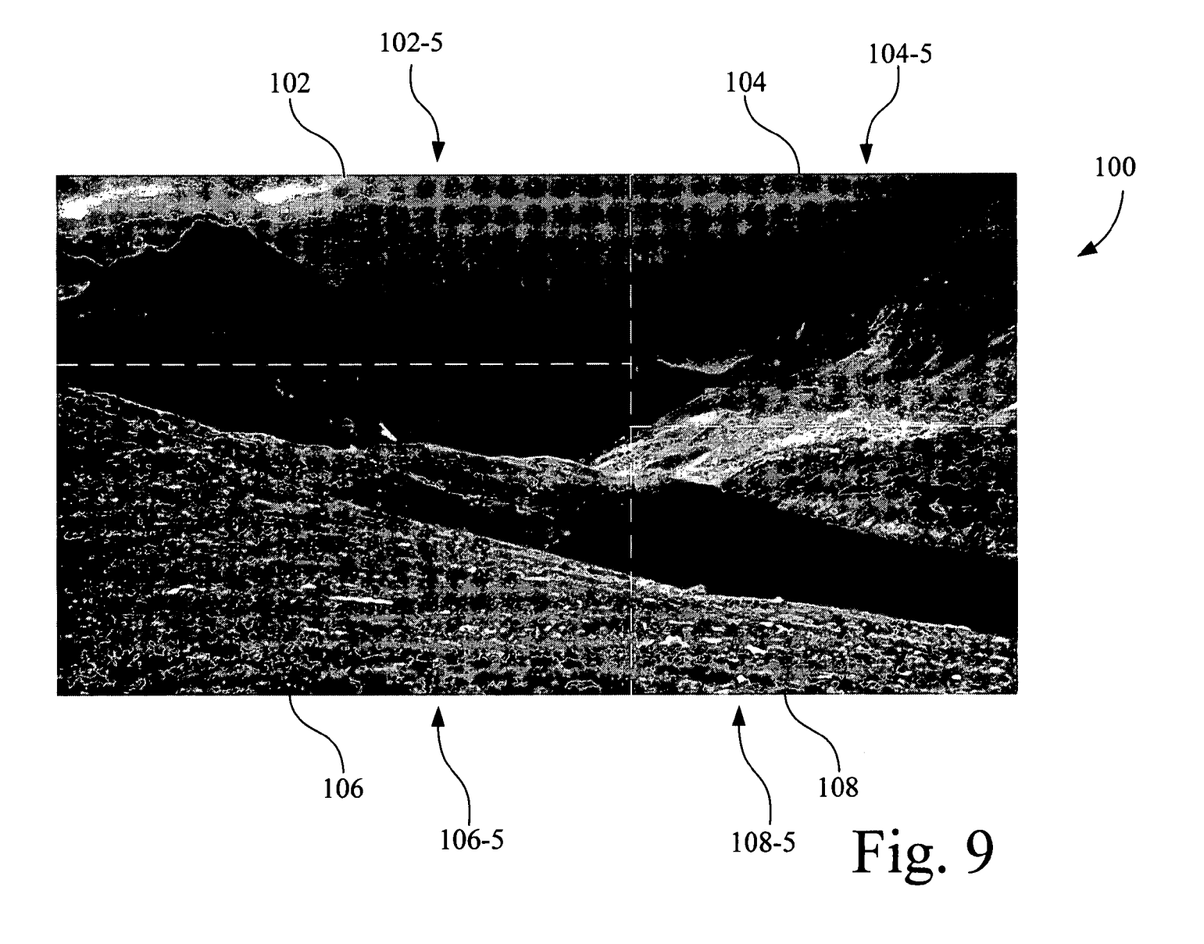
FIG. 9 shows an implementation wherein the seams between adjacent image panels are offset.

In the implementation depicted in FIG. 9, the size of the plurality of image panels 102-5, 104-5, 106-5 and 108-5 is selected so that at least some of the seams, represented by white dashed lines, of the assembled image panels 102-5, 104-5, 106-5 and 108-5 are offset, i.e., staggered, from one another so as to increase the strength of the overall poster.

In the method of FIG. 3 described above, in one embodiment, the operations of printing and incising, e.g., step S204 and S206, are performed as interleaved operations. In other words, printing occurs prior to the completion of incising, and vice-versa, and may occur simultaneously.

In another embodiment, the operations of printing and incising may be performed sequentially. For example, the image portions 102, 104, 106, 108 may be printed on respective sheets of paper, and then the individual sheets of paper may be re-fed through imaging apparatus 12 for the performing of the incising operation.

Alternatively, the shapes of the plurality of image panels 102-5, 104-5, 106-5 and 108-5 may be formed by. incising a plurality of sheets of media along respective incising boundaries 102-2, 104-2, 106-2 and 108-2 to form an outer boundary that corresponds to the shape of the respective image panel, including any location tabs, prior to the printing of image portions 102, 104, 106, 108. Then, at some later time, the plurality of image panels 102-5, 104-5, 106-5 and 108-5 may be fed through imaging apparatus 12 to perform the printing operation to print image portions 102, 104, 106, 108 thereon. For example, during the printing operation, each outer boundary of image panels 102-5, 104-5, 106-5 and 108-5 is associated with a respective image boundary, e.g., image boundary 102-2, 104-2, 106-2 and 108-2, of one image portion of the plurality of image portions 102, 104, 106 and 108, wherein the image boundary is coincident with the outer boundary only where no location tab exits. Then, the printing operation is performed by printing unit 22 to print image portions 102, 104, 106, 108 on the respective pre-incised image panels 102-5, 104-5, 106-5 and 108-5.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for using an imaging apparatus having a printing unit and an incising unit to generate a plurality of image panels for assembly as a poster for displaying an image represented by image data, said image data being divided into a plurality of image data portions representing a corresponding plurality of image portions of said image, said method comprising:

determining an individual two-dimensional image boundary for each of said plurality of image data portions;

associating a corresponding two-dimensional incising boundary with each said individual image boundary, wherein at least a portion of each said individual image boundary is coincident with said corresponding incising boundary;

printing an image portion of said plurality of image portions at a location on a sheet of media with said printing unit in accordance with said individual image boundary of an image data portion that corresponds to said image portion;

incising by use of one of a perforation device and a cutting device in said incising unit said sheet of media with said incising unit along said corresponding incising boundary that is associated with said individual image boundary of said image data portion to form an individual image panel of said plurality of image panels; and     repeating said printing and said incising until all of said plurality of image data portions are processed to form said plurality of image panels.

2. The method of claim 1, wherein each incising boundary includes a plurality of location tabs that extend outwardly from a corresponding image boundary to aid assembly of said plurality of image panels.

3. The method of claim 2, wherein said plurality of image panels are formed from a plurality of sheets of media, with each of said plurality of image panels being formed from a separate sheet of media.

4. The method of claim 3, wherein a first location tab of one image panel of said plurality of image panels is positioned to interlock between a pair of location tabs of a second image panel of said plurality of image panels.

5. The method of claim 3, wherein said incising includes:

forming a slot through a first sheet of media of said plurality of sheets of media along a first image boundary of said first sheet of media; and     forming a location tab in a second sheet of media of said plurality of sheets of media that extends outwardly from a second image boundary of said second sheet of media, wherein said slot of said first sheet of media is sized to receive said location tab of said second sheet of media.

6. The method of claim 5, wherein said slot is formed in a location tab of said first sheet of media.

7. The method of claim 2, wherein each location tab has an identifier printed thereon to aid in assembly of said poster.

8. The method of claim 2, wherein said incising includes forming at least one location tab to have an elongate portion, and at least one tab extension extending laterally outwardly from said elongate portion.

9. The method of claim 1, wherein the operations of printing and incising are performed sequentially.

10. The method of claim 1, wherein the operations of printing and incising are performed as interleaved operations.

11. The method of claim 1, wherein each incising boundary is represented by a plurality of incising coordinates that are supplied to said incising unit.

12. The method of claim 1, wherein said incising unit performs said incising by forming spaced perforations in said sheet of media.

13. The method of claim 1, wherein said incising unit performs said incising by forming a continuous cut.

14. An imaging apparatus configured to generate a plurality of image panels for assembly as a poster for displaying an image represented by image data, said image data having been divided into a plurality of image data portions representing a corresponding plurality of image portions of said image, comprising:

a printing unit for performing printing operations;

an incising unit for performing incising operations on a sheet of media, said incising unit including one of a perforation device and a cutting device; and     a controller communicatively coupled to said printing unit and said incising unit, said controller executing program instructions to perform the acts of:

determining an individual two-dimensional image boundary for each of said plurality of image data portions;

associating a corresponding two-dimensional incising boundary with each said individual image boundary, wherein at least a portion of each said individual image boundary is coincident with said corresponding incising boundary;

controlling said printing unit to perform the operation of printing an image portion of said plurality of image portions at a location on the sheet of media in accordance with said individual image boundary of an image data portion that corresponds to said image portion;

controlling said incising unit to perform the operation of incising said sheet of media along said corresponding incising boundary that is associated with said individual image boundary of said image data portion that corresponds to said image portion to form an individual image panel of said plurality of image panels; and         repeating the operations of printing and said incising until all of said plurality of image data portions are processed to form said plurality of image panels.

15. The imaging apparatus of claim 14, wherein each incising boundary includes a plurality of location tabs that extend outwardly from said image boundary to aid assembly of said plurality of image panels.

16. The imaging apparatus of claim 14, wherein the operations of printing and incising are performed sequentially.

17. The imaging apparatus of claim 14, wherein the operations of printing and incising are performed as interleaved operations.

18. The imaging apparatus of claim 14, wherein each incising boundary is represented by a plurality of incising coordinates that are supplied to said incising unit by said controller.

19. The imaging apparatus of claim 14, wherein said incising unit performs said incising by forming spaced perforations in said sheet of media.

20. The imaging apparatus of claim 14, wherein said incising unit performs said incising by forming a continuous cut.

21. A method for generating a plurality of image panels for assembly as a poster for displaying an image represented by image data, said image data being divided into a plurality of image data portions representing a corresponding plurality of image portions of said image, comprising:

(a) providing a sheet of media having a plurality of incisions formed on an outer boundary, said incisions formed by use of one of a perforation device and a cutting device within an imaging apparatus, and said outer boundary including a plurality of location tabs;

(b) associating said outer boundary with an image boundary of one image portion of a plurality of image portions, wherein said image boundary is coincident with said outer boundary only where no location tab exists; and (c) feeding said sheet of media having said plurality of incisions formed on said outer boundary thereof and said plurality of location tabs into the imaging apparatus to print said one image portion on said sheet of media.

22. The method of claim 21, wherein said plurality of image panels are formed from a plurality of sheets of media having said plurality of incisions formed on said outer boundary, with each of said plurality of image panels being formed from a separate sheet of media.

23. The method of claim 22, further comprising repeating acts (a), (b) and (c) until all of said plurality of data portions are processed to form said plurality of image panels.

* * * * *